(12) United States Patent
Terwonne et al.

(10) Patent No.: US 9,680,141 B2
(45) Date of Patent: Jun. 13, 2017

(54) SEPARATOR COMPRISING AN ORGANIC-INORGANIC ADHESION PROMOTER

(71) Applicants: Rolf-Walter Terwonne, Marl (DE); Witold Friedemann Rex, Sprockhoevel (DE); Matthias Pascaly, Frankfurt (DE); Michael Kube, Haltern am See (DE); Christian Hying, Rhede (DE)

(72) Inventors: Rolf-Walter Terwonne, Marl (DE); Witold Friedemann Rex, Sprockhoevel (DE); Matthias Pascaly, Frankfurt (DE); Michael Kube, Haltern am See (DE); Christian Hying, Rhede (DE)

(73) Assignee: Litarion GmbH, Kamenz (DE)

( * ) Notice: Subject to any disclaimer, the term of this patent is extended or adjusted under 35 U.S.C. 154(b) by 0 days.

(21) Appl. No.: 14/375,700

(22) PCT Filed: Jan. 29, 2013

(86) PCT No.: PCT/EP2013/051626
§ 371 (c)(1),
(2) Date: Jul. 30, 2014

(87) PCT Pub. No.: WO2013/113673
PCT Pub. Date: Aug. 8, 2013

(65) Prior Publication Data
US 2015/0017512 A1 Jan. 15, 2015

(30) Foreign Application Priority Data

Jan. 30, 2012 (DE) .................. 10 2012 201 251
Jan. 18, 2013 (DE) .................. 10 2013 200 722

(51) Int. Cl.
| | |
|---|---|
| H01M 2/16 | (2006.01) |
| H01M 2/14 | (2006.01) |
| C08K 5/05 | (2006.01) |
| C08K 5/541 | (2006.01) |
| H01M 10/0525 | (2010.01) |

(52) U.S. Cl.
CPC ............. H01M 2/145 (2013.01); C08K 5/05 (2013.01); C08K 5/541 (2013.01); H01M 2/16 (2013.01); H01M 2/166 (2013.01); H01M 2/1633 (2013.01); H01M 2/1666 (2013.01); H01M 2/1686 (2013.01); H01M 10/0525 (2013.01)

(58) Field of Classification Search
CPC ........................ H01M 2/1686; H01M 2/14
See application file for complete search history.

(56) References Cited

U.S. PATENT DOCUMENTS

| | | | |
|---|---|---|---|
| 5,773,103 A | 6/1998 | Ciora, Jr. et al. | |
| 6,420,324 B1 | 7/2002 | Ebbrecht et al. | |
| 6,620,320 B1 | 9/2003 | Hying et al. | |
| 6,841,075 B2 | 1/2005 | Penth et al. | |
| 7,351,494 B2 | 4/2008 | Hennige et al. | |
| 7,525,788 B2 | 4/2009 | Hoerpel et al. | |
| 7,575,832 B2 | 8/2009 | Hennige et al. | |
| 7,655,360 B2 | 2/2010 | Hennige et al. | |
| 7,682,731 B2 | 3/2010 | Hennige et al. | |
| 7,790,321 B2 | 9/2010 | Hennige et al. | |
| 7,807,286 B2 | 10/2010 | Hennige et al. | |
| 7,892,673 B2 | 2/2011 | Hennige et al. | |
| 7,959,011 B2 | 6/2011 | Hennige et al. | |
| 8,016,896 B2 | 9/2011 | Hennige et al. | |
| 8,142,920 B2 | 3/2012 | Hennige et al. | |
| 8,337,974 B2 | 12/2012 | Hennige et al. | |
| 2002/0169217 A1 | 11/2002 | Ebbrecht et al. | |
| 2005/0084761 A1 | 4/2005 | Hennige et al. | |
| 2005/0087491 A1 | 4/2005 | Hennige et al. | |
| 2006/0078791 A1 | 4/2006 | Hennige et al. | |
| 2007/0178375 A1* | 8/2007 | Kobayashi ......... | H01M 2/1653 429/144 |
| 2008/0190841 A1 | 8/2008 | Pascaly et al. | |
| 2008/0248381 A1 | 10/2008 | Hennige et al. | |

(Continued)

FOREIGN PATENT DOCUMENTS

| | | |
|---|---|---|
| CN | 101796669 A | 8/2010 |
| DE | 199 17 186 C1 | 9/2000 |

(Continued)

OTHER PUBLICATIONS

English Translation: WO 2003061050.*

(Continued)

*Primary Examiner* — Stewart Fraser
*Assistant Examiner* — Olatunji Godo
(74) *Attorney, Agent, or Firm* — Oblon, McClelland, Maier & Neustadt, L.L.P.

(57) ABSTRACT

The invention relates to a process for producing a separator comprising the steps of: providing a sheetlike porous substrate, a solvent, ceramic particles and an adhesion promoter; preparing a slip by mixing the solvent, the adhesion promoter and the ceramic particles; coating the substrate with the slip and thermally drying the coated substrate to obtain the separator. The problem addressed is that of specifying a process useful for producing separators having a higher ceramic content. The problem is solved when the solvent used is a mixture of water and at least one organic component; the adhesion promoter used is a mixture of silanes and at least one thermally crosslinkable acrylic polymer; the slip is admixed with a carboxylic acid preparation and also with a defoamer component free from silicone oil.

19 Claims, No Drawings

(56) References Cited

U.S. PATENT DOCUMENTS

| | | |
|---|---|---|
| 2009/0269489 A1 | 10/2009 | Hennige et al. |
| 2010/0221965 A1* | 9/2010 | Katayama ............... H01G 9/02 442/59 |
| 2010/0279173 A1 | 11/2010 | Hying et al. |
| 2010/0323233 A1 | 12/2010 | Hennige et al. |
| 2012/0244412 A1 | 9/2012 | Pascaly et al. |
| 2012/0251890 A1 | 10/2012 | Pascaly et al. |
| 2012/0308871 A1 | 12/2012 | Pascaly et al. |
| 2013/0302695 A1 | 11/2013 | Beer et al. |
| 2014/0127546 A1 | 5/2014 | Pascaly et al. |

FOREIGN PATENT DOCUMENTS

| | | |
|---|---|---|
| DE | 102 38 940 A1 | 3/2004 |
| DE | 10 2009 002 680 A1 | 11/2010 |
| WO | WO 99/62620 A1 | 12/1999 |
| WO | WO 02/080296 A2 | 10/2002 |
| WO | WO 02/080297 A2 | 10/2002 |
| WO | WO 02/089950 A2 | 11/2002 |
| WO | WO 03/013708 A2 | 2/2003 |
| WO | WO 03/021697 A2 | 3/2003 |
| WO | WO 03061050 * | 7/2003 |
| WO | WO 03/069708 A2 | 8/2003 |
| WO | WO 03/069711 A2 | 8/2003 |
| WO | WO 03/072231 A2 | 9/2003 |
| WO | WO 03/072232 A1 | 9/2003 |
| WO | WO 03/072233 A1 | 9/2003 |
| WO | WO 03/073534 A2 | 9/2003 |
| WO | WO 03/073534 A3 | 9/2003 |
| WO | WO 03/073543 A2 | 9/2003 |
| WO | WO 03/073545 A2 | 9/2003 |
| WO | WO 2004/021476 A1 | 3/2004 |
| WO | WO 2004/021477 A1 | 3/2004 |
| WO | WO 2004/021499 A2 | 3/2004 |
| WO | WO 2004/049471 A2 | 6/2004 |
| WO | WO 2004/049471 A3 | 6/2004 |
| WO | WO 2004/049472 A2 | 6/2004 |
| WO | WO 2004/049480 A2 | 6/2004 |
| WO | WO 2005/038833 A2 | 4/2005 |
| WO | WO 2005/038946 A2 | 4/2005 |
| WO | WO 2005/038959 A1 | 4/2005 |
| WO | WO 2005/038960 A1 | 4/2005 |
| WO | WO 2007/028662 A1 | 3/2007 |
| WO | WO 2011/012396 A1 | 2/2011 |
| WO | WO 2012/143158 A1 | 10/2012 |
| WO | WO 2013/113673 A1 | 8/2013 |

OTHER PUBLICATIONS

U.S. Appl. No. 13/266,940, filed Oct. 28, 2011, Pascaly, et al.
U.S. Appl. No. 14/384,041, filed Sep. 9, 2014, Pascaly, et al.
International Search Report issued May 3, 2013 in PCT/EP2013/051626.
English translation of Office Action issued Nov. 30, 2015 in Chinese Patent Application No. 201380007074.1.

* cited by examiner

SEPARATOR COMPRISING AN ORGANIC-INORGANIC ADHESION PROMOTER

The invention relates to a process for producing a separator comprising the steps of: providing a sheetlike porous substrate, a solvent, ceramic particles and an adhesion promoter; preparing a slip by mixing the solvent, the adhesion promoter and the ceramic particles; coating the substrate with the slip and thermally drying the coated substrate to obtain the separator.

Separators for the purpose of this invention are porous layered articles used for separating fluids in chemical engineering or for insulating electrodes of an electric energy store or of an electrochemical cell.

EP 1478451 B1 discloses separators comprising an organic supporting substrate having a ceramic coating. In their production process, the supporting substrate is provided in the form of a nonwoven web of organic fibres which is coated with a slip containing ceramic particles and thermally cured. A metal oxide sol is employed as an adhesion promoter. The separators thus obtained have mostly outstanding technical properties, but the metal oxide adhesion promoter of the ceramic particles limits the flexibility of the layers to a specified maximum bending radius.

A desirable separator in view of this prior art has, for example through deployment of organic adhesion promoters, an increased maximum bending radius whilst retaining the supreme technical properties of the separators described in EP 1478451 B1 and being obtainable in a process performed similarly to this prior art.

A water-based process for producing a ceramic separator with organic adhesion promoter is known from EP 2034540 A1. The layered article disclosed therein comprises an organic fibrous nonwoven web as supporting substrate having a coating of ceramic particles. The ceramic particles are bonded with an organic polymer to the fibres of the fibrous nonwoven web.

For production, a slip in the form of an aqueous dispersion containing the ceramic particles and also the dissolved binder is applied to the fibrous nonwoven web and dried. The solids content of the slip is supposed to be up to 70 wt %.

This teaching is disadvantageous because of the low ceramic content of the slip, which after coating the organic substrate leads to a low ceramic content of the separator. The separator thus obtained is therefore overwhelmingly organic and hence scarcely able to resist high thermal stresses.

The problem addressed by the invention in view of this prior art is that of specifying a process useful for producing separators having a higher ceramic content.

The problem is solved when in the process mentioned in the introduction the solvent used is a mixture of water and at least one organic component; the adhesion promoter used is a mixture of silanes and at least one thermally crosslinkable acrylic polymer; the slip is mixed with a carboxylic acid preparation and with a defoamer component free from silicone oil.

A carboxylic acid preparation for the purposes of the invention is a mixture of fatty, oily and/or polymeric carboxylic acids too weak to catalyze hydrolytic condensation of silanes. The mixture has a melting point below 80° C., preferably a melting point below 45° C. and more preferably a melting point below 25° C., melting point being defined as the lowest temperature at which the carboxylic acid preparation is free from solid constituents.

The fatty and/or oily acids may have branched or unbranched chains of in each case from 8 to 20 carbon atoms and preferably from 10 to 18 carbon atoms each.

The polymeric carboxylic acids are selected from poly (acrylic acid), poly(methacrylic acid), and/or co-polymers selected from poly(acrylic acid-methacrylic acid), or salts thereof. Carboxylic acids of this type are commercially available and familiar to a person skilled in the art under the product family name of Dolapix, obtainable for example from Zschimmer & Schwarz, or Darvan R.T. Vanderbilt Company Inc.

The carboxylic acid preparation used according to the invention contains no silicon-containing compounds.

The invention accordingly provides a process for producing a separator comprising the steps of:
a) providing a sheetlike porous substrate;
b) providing a solvent;
c) providing ceramic particles;
d) providing an adhesion promoter;
e) preparing a slip by mixing the solvent, the adhesion promoter and the ceramic particles;
f) coating the substrate with the slip;
g) thermally drying the coated substrate to obtain the separator;
h) wherein the solvent used is a mixture of water and at least one organic component;
i) wherein the adhesion promoter used is a mixture of silanes and at least one thermally crosslinkable acrylic polymer;
k) wherein the slip is admixed with a carboxylic acid preparation having a melting point below 80° C.;
l) and wherein the slip is admixed with a defoamer component free from silicone oil.

The invention rests on the surprising realization that the separator obtained in this way has improved mechanical properties due to the acrylic polymer in the adhesion promoter whilst the silane content of the adhesion promoter works to provide a significant increase over the prior art in the ceramic content and hence in thermal stability.

Tests show that industrial production of the organic/inorganic adhesion promoter mixture would be impossible without admixing the carboxylic acid composition and the silicone oil-free defoamer component. It is only the use of these two processing auxiliaries which makes possible the first production of a both organically and inorganically bound separator.

The both organically and inorganically bound separator combines the advantages of purely organically bound separators with those where purely inorganic binders are employed.

Preferably, the step of thermally curing the coated substrate to obtain the separator cures the silanes and crosslinks the acrylic polymer and is carried out at a temperature below the glass transition temperature $T_G$ of the acrylic polymer. As long as the glass transition temperature of the acrylic polymer is not exceeded, embrittlement thereof is unlikely. As a result, the separator retains the preferred flexural stiffness.

Preferably, the acrylic polymer used swells little or preferably not at all in the solvent used and is infusible after crosslinking. Swelling is to be understood as meaning a volume increase on the part of the polymer due to penetration by solvent molecules.

Self-crosslinking acrylic polymers based on ethyl acrylate and methyl methacrylate which are commercially available as an aqueous dispersion are particularly suitable. Plextol BV 595 from SYNTHOMER Deutschland GmbH, Werrastr. 10, DE-45768 Marl, is one example of an aqueous dispersion of a self-crosslinking acrylic polymer based on ethyl acrylate and methyl methacrylate.

The inorganic adhesion promoter component used preferably comprises one or more silanes selected from the group comprising 3-aminopropyltriethoxysilane, 2-aminoethyl-3-aminopropyltrimethoxysilane, 3-glycidyloxytrimethoxysilane, 3-methacryloyloxypropyltrimethoxysilane, vinyltriethoxysilane, vinyltrimethoxysilane and vinyltris(2-methoxy-ethoxy)silane, methyltriethoxysilane, 3-glycidyloxypropyltriethoxysilane.

The adhesion promoter used may preferably also be a mixture of silanes, at least one thermally crosslinkable acrylic polymer and at least one silicate, in particular tetraethyl orthosilicate. The silicate then is a second inorganic adhesion promoter component, in addition to the silane. This increases the ceramic content of the separator.

Preferably, in the mixture of silanes and acrylic polymer used as adhesion promoter silanes account for 25 to 45 wt % and acrylic polymer accounts for the remainder.

According to the invention, the ceramic fraction of solids is in the range from 45 to 60 wt % in the slip and below 90 wt % in the cured coating material. The fibrous nonwoven web coated therewith accordingly gives rise to a separator having a ceramic content of up to 80 wt %.

In one particularly preferred embodiment of the invention, the slip is admixed with a defoamer component free from silicone oil in the step of preparing the slip. This is because it was found that the silicone oils typically used as industrial defoamers—polyorganosiloxanes, that is—cause damaged areas in the coating. Admixing a silicone-free defoamer customary in the food sector makes it possible to process the acrylic polymer without having to accept the retention of gas-filled micelles in the separator.

Commercially available defoamers based on an organic supporting medium such as, in particular, paraffin oil which contain organic solids as additionally foam-breaking component are particularly useful as defoamer component. Suitable defoamers are disclosed in DE 19917186 C1 and EP 0878224 A1.

The proportion of defoamer component in the slip need not be more than 200 ppm to obtain the desired effect.

The solvent used is a mixture of water and an organic component. The organic component used can be any of the customary organic solvents. The simplest is to use an alcohol, in particular ethanol. Ethanol meets all the technical requirements, is less toxic compared with other organic solvents and is inexpensive.

Porous substrate used is preferably a fibrous nonwoven web. A fibrous nonwoven web is a textile sheet material composed of a multiplicity of randomly directed, mutually adherent fibres. It is preferable to use a fibrous nonwoven web composed of organic fibres, wherein the organic fibres are selected from polyacrylonitrile, polyester, polyimide, polyamide, polytetrafluoroethylene, polyethylene terephthalate or polyolefin.

In a preferred development of the invention, the ceramic particles have a non-spherical structure and are selected from oxides of the metals Al, Zr, Si, Ti and/or Y.

In a particularly preferred development of the invention, the acrylic polymer is introduced into the production process in the form of a dispersion. Plextol BV 595, useful as acrylic polymer, is supplied as an aqueous dispersion.

The slip is prepared by these steps in particular:
a) introducing the carboxylic acid composition into a first portion of the solvent;
b) dispersing the ceramic particles in said first portion of the solvent to obtain a dispersion;
c) introducing the silanes and the acrylic polymer into a second portion of the solvent to obtain a sol;
d) mixing the dispersion and the sol to obtain the slip;
e) admixing the defoamer component to the slip.

The invention also provides a separator obtainable/obtained in the process of the present invention.

A separator of this type is from 18 to 25 µm, preferably from 20 to 23 µm in thickness and has a porosity between 30 and 70%, preferably between 40 and 60%, reckoned as the quotient between the geometric density and the density measured by helium pycnometry. Its ceramic content should be up to 80 wt %.

The separator obtained according to the invention is particularly useful for insulating electrodes of an electric energy store or of an electrochemical cell, in particular in a double-layered capacitor or a rechargeable battery.

Since the organic-inorganic adhesion promoter is an essential aspect of the separator according to the invention, a mixture containing water, alcohol, silanes, at least one thermally crosslinkable acrylic polymer, a carboxylic acid preparation and a defoamer component free from silicone oil, wherefrom the adhesion promoter is derived, likewise forms part of the subject-matter of the invention.

This mixture is useful as an organic-inorganic adhesion promoter particularly in the production of separators.

The invention will now be more particularly described by means of examples.

EXAMPLE 1 (Inventive)

Providing the fibrous nonwoven web:

The substrate used for producing the inventive separator is a fibrous nonwoven web composed of polyethylene terephthalate fibres. The fibres are between 1 and 15 µm in thickness, while the web has an overall thickness of 15 to 18 µm. The substrate of the inventive separator includes fibres having a softening temperature above 100° C. and a melting temperature above 110° C. Substrate porosity is in the range from 50 to 70%.

Preparing the slip:

To an initial charge of 13 kg of a 70:30 water/ethanol mixture is added 0.05 kg of a carboxylic acid composition which contains Dolapix CE 64 from Zschimmer & Schwarz GmbH & Co. KG Chemische Fabriken, DE-56112 Lahnstein, followed by the dispersal therein of 15 kg of ct1200 alumina from Almatis Inc, Leetsdale, Pa. 15065, USA. The resulting mixture has to be homogenized with a stirred motor for at least 16 hours. Thereto is added, after sufficient stirring time has elapsed, a sol composed of an initially charged 50:50 water/ethanol mixture (0.84 kg), tetraethyl orthosilicate (0.08 kg), methyltriethoxysilane (0.31 kg), 3-glycidyloxypropyltriethoxysilane (0.45 kg) and Plextol BV 595 self-crosslinking acrylic polymer from Synthomer (0.67 kg). The sol is externally prepared, stirred for at least 60 minutes and then introduced into the slip which then has to be homogenized for at least a further 16 hours. Before commencement of the coating operation, about 5 g of TEGO® Antifoam 2290 defoamer additive from Evonik Industries AG, Goldschmidtstr. 100, DE-45127 Essen, are introduced into the slip.

Coating the fibrous nonwoven web with the slip:

A fibrous nonwoven polyethylene terephthalate web 18 µm in thickness and 6 g/m$^2$ in basis weight is coated with the above-described slip in a continuous roll-on process (linear web speed about 150 m/h, T=150° C.). The result is a separator having a thickness of 25 µm, a basis weight of 28 g/m$^2$ and a porosity of about 55%.

Drying the fibrous nonwoven web:

The cure following the coating step takes place in-line in a circulating air oven at T≤200° C. It may be advantageous for the separator thus obtained to be subsequently heat-treated for 24 hours at T≥110° C.

EXAMPLE 2 (Not Inventive)

Providing the fibrous nonwoven web:

A fibrous nonwoven web composed of polyethylene terephthalate fibres is provided as substrate. The fibres are from 2 to 15 μm in thickness, while the overall substrate (fibrous nonwoven web) is from 15 to 18 μm in thickness. The substrate preferably includes fibres having a softening temperature above 100° C. and a melting temperature above 110° C. Substrate porosity is in the range from 50 to 70%.

Preparing the slip:

In an initial charge of 13 kg of a 70:30 water/ethanol mixture are dispersed 15 kg of ct1200 alumina. The resulting mixture has to be homogenized with a stirred motor for at least 16 hours. Thereto is added, after sufficient stirring time has elapsed, a sol composed of an initially charged 50:50 water/ethanol mixture (0.84 kg), tetraethyl orthosilicate (0.08 kg), methyltriethoxysilane (0.31 kg), 3-glycidyloxy-propyltriethoxysilane (0.45 kg) and Plextol BV 595 self-crosslinking acrylic polymer (0.67 kg). The sol is externally prepared, stirred for at least 60 minutes and then introduced into the slip which then has to be homogenized for at least a further 16 hours. Before commencement of the coating operation, about 5 g of TEGO® Antifoam 2290 defoamer additive are introduced into the slip.

The addition of Dolapix CE 64 carboxylic acid composition is eschewed in this case.

Coating the fibrous nonwoven web with the slip:

In the absence of the carboxylic acid composition, it is impossible to adjust the viscosity of the slip. Owing to the excessive viscosity, the dispersion cannot be coated in a continuous roll-on process, and therefore the inventive production of a ceramic separator is impossible in this way.

EXAMPLE 3 (Not Inventive)

Providing the fibrous nonwoven web:

A fibrous nonwoven web substrate composed of polyethylene terephthalate fibres is provided. The fibres are from 2 to 15 μm in thickness, while the overall substrate is from 15 to 18 μm in thickness. The substrate preferably includes fibres having a softening temperature above 100° C. and a melting temperature above 110° C. Substrate porosity is in the range from 50 to 70%.

Preparing the slip:

To an initial charge of 13 kg of a 70:30 water/ethanol mixture is added 0.05 kg of Dolapix CE 64 carboxylic acid composition followed by the dispersal therein of 15 kg of ct1200 alumina. The resulting mixture has to be homogenized with a stirred motor for at least 16 hours. Thereto is added, after sufficient stirring time has elapsed, a sol composed of an initially charged 50:50 water/ethanol mixture (0.84 kg), tetraethyl orthosilicate (0.08 kg), methyltriethoxysilane (0.31 kg), 3-glycidyloxypropyltriethoxysilane (0.45 kg) and Plextol BV 595 self-crosslinking acrylic polymer (0.67 kg). The sol is externally prepared, stirred for at least 60 minutes and then introduced into the slip which then has to be homogenized for at least a further 16 hours. The addition of defoamer before commencement of the coating operation is eschewed in this case.

Coating the fibrous nonwoven web with the slip:

A fibrous nonwoven polyethylene terephthalate web 18 μm in thickness and 6 g/m² in basis weight is coated with the above-described slip in a continuous roll-on process (linear web speed about 150 m/h, T=150° C.). The resulting separator with a thickness of 25 μm, a basis weight of 28 g/m² and a porosity of about 55% corresponds to the inventive separator, but coating quality is impaired by defects due to blistering during production.

Drying the fibrous nonwoven web:

The cure following the coating step takes place in-line in a circulating air oven at T≥200° C.

CONCLUSION

Comparison of Examples 1, 2 and 3 shows that the organically/inorganically bound separator is obtainable in the quality needed for the intended service by using the carboxylic acid composition and the defoamer.

The invention claimed is:

1. A method for producing a separator, said method comprising:
    a) preparing a slip, comprising:
    a solvent comprising water and at least one organic compound;
    a thermally crosslinkable acrylic polymer;
    at least one silane selected from the group consisting of 3-aminopropyltriethoxysilane, 2-aminoethyl-3-aminopropyltrimethoxysilane, 3-glycidyloxy-trimethoxysilane, 3-methacryloyloxypropyltrimethoxysilane, vinyltriethoxysilane, vinyltrimethoxysilane, vinyltris(2-methoxyethoxy)silane, methyltriethoxysilane, and 3-glycidyloxypropyltriethoxysilane;
    particles of a ceramic;
    a carboxylic acid mixture having a melting point below 80° C. comprising carboxylic acids selected from the group consisting of a fatty carboxylic acid, an oily carboxylic acid and a polymeric carboxylic acid; and
    a silicone oil free defoamer;
    b) coating a sheetlike porous substrate with the slip; and
    c) thermally drying the coated substrate to obtain the separator.

2. The method according to claim 1, wherein thermally drying the coated substrate to obtain the separator in c) cures the silanes, crosslinks the acrylic polymer, and is carried out at a temperature below the glass transition temperature $T_G$ of the acrylic polymer.

3. The method according to claim 1, wherein the acrylic polymer swells little or not at all in the solvent and is infusible after crosslinking in c).

4. The method according to claim 1, wherein the slip further comprises a silicate.

5. The method according to claim 1, wherein the silicone oil free defoamer component comprises an organic supporting medium and an organic solid.

6. The method according to claim 1, wherein the organic component of the solvent is an alcohol.

7. The method according to claim 1, wherein the porous substrate is a fibrous nonwoven web.

8. The method according to claim 1, wherein the porous substrate is a fibrous nonwoven web comprising organic fibres selected from the group consisting of polyacrylonitrile, polyester, polyimide, polyamide, polytetrafluoroethylene, polyethylene terephthalate and polyolefin.

9. The method according to claim 1,
wherein
the ceramic particles have a non-spherical structure, and
the ceramic is selected from the group consisting of oxides of the metals Al, Zr, Si, Ti and Y.

10. The method according to claim 1,
wherein the thermally crosslinkable acrylic polymer is in the form of a dispersion.

11. The method according to claim 10,
wherein preparing the slip comprises:
a) introducing the carboxylic acid mixture into the solvent;
b) dispersing the ceramic particles in the carboxylic acid mixture solvent composition from a) to obtain a dispersion;
c) introducing the silanes and the acrylic polymer into the solvent to obtain a sol;
d) mixing the dispersion and the sol;
e) admixing the silicone oil free defoamer component to the mixed dispersion and sol to obtain the slip.

12. The method according to claim 1, wherein
a proportion of the silicone oil free defoamer component in the slip is less than 200 ppm.

13. The method according to claim 1, wherein
a proportion of ceramic particles is in the range from 45 to 60 wt % in the slip and more than 90 wt % in the slip dried state.

14. The method according to claim 1,
wherein
a content of the silane is from 25 to 45 wt % based on the weight of the thermally crosslinkable acrylic polymer and the at least one silane.

15. A separator obtained by the process according to claim 1.

16. The separator according to claim 15, wherein a content of the ceramic in the dried cured coating is 80 wt % or less.

17. The separator according to claim 15 wherein a thickness of the separator is from 18 to 25 μm and/or a porosity of the separator is from 30% to 70%.

18. An electric energy store or of an electrochemical cell comprising the separator of claim 15 positioned to insulate an electrode in said energy store or cell.

19. A composition configured for use in producing a separator comprising: a solvent comprising water and an alcohol;
a thermally crosslinkable acrylic polymer;
at least one silane selected from the group consisting of 3-aminopropyltriethoxysilane, 2-aminoethyl-3-aminopropyltrimethoxysilane, 3-glycidyloxy-trimethoxysilane, 3-methacryloyloxypropyltrimethoxysilane, vinyltriethoxysilane, vinyltrimethoxysilane, vinyltris(2-methoxyethoxy)silane, methyltriethoxysilane, and 3-glycidyloxypropyltriethoxysilane;
particles of a ceramic;
a carboxylic acid mixture having a melting point below 80° C. comprising carboxylic acids selected from the group consisting of a fatty carboxylic acid, an oily carboxylic acid and a polymeric carboxylic acid; and a silicone oil free defoamer.

* * * * *